Aug. 19, 1958  W. RUF  2,848,246
STEERING DEVICE FOR MOTOR VEHICLES
Filed Oct. 30, 1956  2 Sheets-Sheet 2

United States Patent Office 2,848,246
Patented Aug. 19, 1958

2,848,246

STEERING DEVICE FOR MOTOR VEHICLES

Walter Ruf, Landhaus am See, Bottighofen, Switzerland

Application October 30, 1956, Serial No. 619,326

Claims priority, application Switzerland November 2, 1955

6 Claims. (Cl. 280—91)

The present invention relates to a steering device for motor vehicles with two pairs of wheels, each pair connected to a steering wheel and steerable through track rods, which device allows both four-wheel steering from each of the steering wheels, as well as the locking of the steering of one or other of the two pairs of wheels in its middle position.

According to the invention, such a device is characterised by a cylinder with two pistons arranged coaxially therein and longitudinally displaceable by means of a pressure medium, of which pistons each is connected through a linkage to the track rod of the pair of wheels assigned to it.

One embodiment of the object of the invention is fully explained by way of example with reference to the accompanying drawing.

Figure 1:
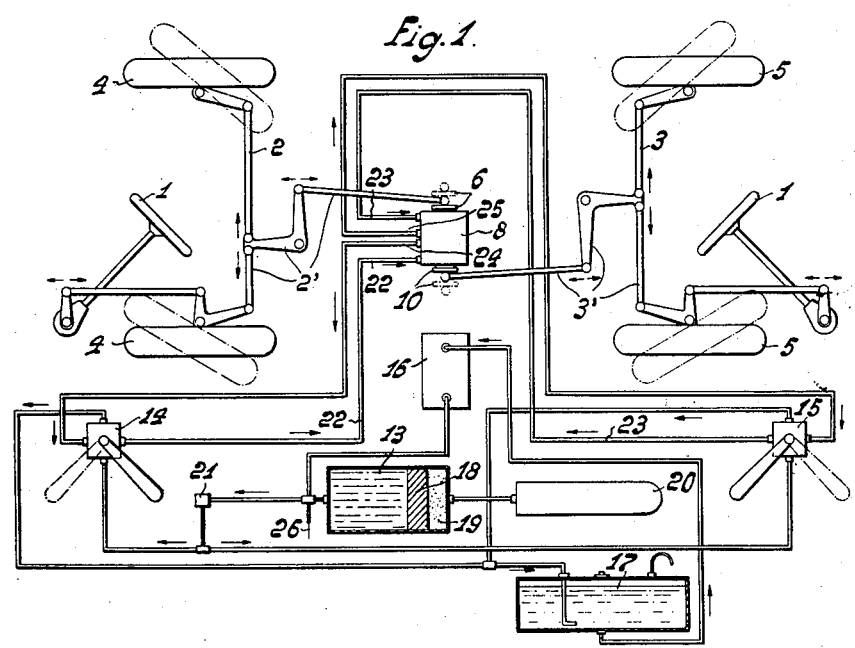
Fig. 1 shows diagrammatically in outline a hydraulic gear-shifting arrangement, by means of which the steering device is controlled as desired.

The steering device according to Fig. 1 intended for a motor vehicle has two pairs of wheels 4 and 5, each pair connected to a steering wheel 1 and steerable in the usual manner through track rods 2 and 3 respectively. The track rod 2 of the pair of wheels 4 is connected through a linkage 2' and a lever 6 to a piston rod 7 (see also Figs. 2 to 4), which projects out at one end of a cylinder 8. At the end of the piston rod 7 within the cylinder, a piston 9 is arranged, which is longitudinally displaceable by means of pressure oil. In an analogous manner, a piston 12 longitudinally displaceable by means of pressure oil is assigned to the pair of wheels 5 through the track rod 3, the linkage 3', a lever 10 and a piston rod 11.

The two pistons 9 and 12 are in addition rotatable in the cylinder 8 and have at their ends coupling claws 9' and 12' respectively, by means of which the pistons can be rigidly connected to each other for the four-wheel steering. Each piston 9 or 12 can also be rigidly connected to the cylinder 8 through other coupling claws 9" and 12" respectively in order to lock the steering of the associated pair of wheels. For this purpose the cylinder 8 is provided with counter-claws 8'.

The cylinder 8 is connected to a pressure-oil stock tank 13, in which there is sufficient pressure medium to allow several manipulations to be carried out in the cylinder. To each pair of wheels 4 or 5 a four-way cock 14 or 15 respectively is assigned, this cock being fitted in the piping connecting the stock tank to the cylinder.

Figure 3:
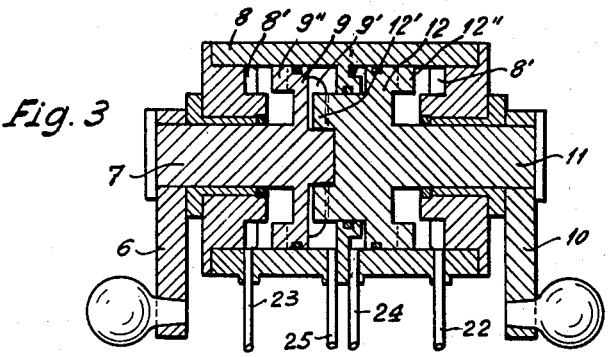

A pump 16 draws oil from an oil tank 17 and forces it into the pressure-oil stock tank 13, whose piston 18 moves to the right and forces the air 19 into an air bottle 20. When all air has been removed from the stock tank 13, the pump 16 may be stopped. Through a pressure regulating valve 21 the two four-way cocks 14 and 15 are supplied with oil. When the handles of the four-way cocks are in the positions indicated in Fig. 1 with full lines, pressure oil is led to cylinder 8 through the pipes 22 and 23. Thereby the pistons 9 and 12 are pressed against each other, so that the claws 9' and 12' engage in each other, as illustrated in Fig. 3. Since the pistons and thereby also the levers 6 and 10 are thus rigidly connected to each other, all four wheels can be steered from each steering wheel. The oil forced out of the cylinder flows back into the tank 17 through the pipes 24 and 25.

Figure 2:
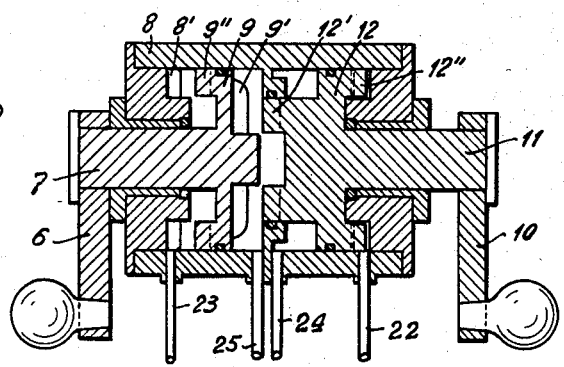
Figs. 2 to 4 show in vertical section three different positions of pistons arranged in a cylinder.
Figure 4:
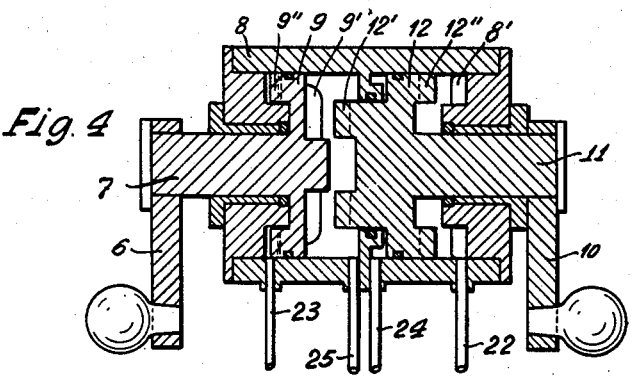

When it is desired to lock one of the pairs of wheels so that only one pair of wheels is steerable, or when it is desired to make all four wheels steerable, the wheels are brought into straight-ahead position, as shown in solid lines in Fig. 1, which brings the levers 6 and 10 into vertical position as shown in Figs. 2, 3 and 4, and the claws on pistons 9 and 12 are consequently brought into vertical position as seen in these figures.

The locking of the steering of the pair of wheels 5 is effected in the following manner: The handle of the four-way cock 14 is moved into the chain-dotted position. The direction of the pressure oil in pipes 22 and 24 is changed. The pressure oil goes through pipe 24 into the cylinder 8 and presses the piston 12 to the right into the claws 8' (Fig. 2). The lever 10 must then stand vertical, this corresponding to the middle position of the pair of wheels 5. The oil flowing away returns to the oil tank 17 through pipe 22 and cock 14. The lever 10 is now locked and keeps the pair of wheels 5 fixed for running straight ahead. The lever 6 participates in the obliquity of the pair of wheels 4, which corresponds for instance to front-wheel steering.

If the pair of wheels 5 has to be made steerable instead of the pair 4, the handle of the cock 14 must first of all be turned back again into its position represented by full lines. Consequently, there is again four-wheel steering. The pair of wheels 4 must then also be in the middle position. Now the handle of the four-way cock 15 is turned into the chain-dotted position. The direction of flow of the pressure oil in the pipes 23 and 25 changes. The pressure oil passes through pipe 25 into the cylinder 8 and presses the piston 9 with its claws 9' to the the left into the claws 8' (Fig. 4). The oil flowing away returns to the oil tank 17 through pipe 23 and cock 15. The piston 9 is locked and keeps the pair of wheels 4 fixed in the position for running straight ahead. The piston 12 participates in the obliquity of the pair of wheels 5, which corresponds for instance to back-wheel steering.

Pipe 26 leads the oil back into the oil tank 17 through an overflow valve that is not shown; to the pipe 26, however, a hydraulic lifting-jack device may for instance be connected, which—depending on the content of tank 13— can be set a few times into operation without the oil pump running.

What is claimed is:

1. In a vehicle having two pairs of wheels, a track rod connecting the two wheels of each of said pairs for steering movement of said wheels, a first linkage connected to one of said track rods and a second linkage connected to the other of said track rods, a first steering wheel connected to act upon the track rod of one of said pairs of wheels, a second steering wheel connected to act upon the track rod of the other of said pair of wheels, a cylinder containing two axially-aligned pistons axially and displaceable individually within said cylinder by fluid pressure means, means within said cylinder and on said pistons and selectively coupling one of said pistons to said cylinder and selectively coupling said pistons to each other, one of said pistons being connected to the linkage to one pair of wheels and the other of said pistons being connected to the linkage to the other pair of wheels.

2. In a vehicle having two pairs of wheels, a track rod connecting the two wheels of each of said pairs for steering movement of said wheels, a first linkage connected to one of said track rods and a second linkage connected to the other of said track rods, a first steering wheel connected to act upon the track rod of one of said pairs of wheels, a second steering wheel connected to act upon the track rod of the other of said pair of wheels, a cylinder containing two axially-aligned pistons axially and displaceable individually within said cylinder by fluid pressure means, means within said cylinder and on said pistons for selectively coupling one of said pistons to said cylinder, one of said pistons being connected to the linkage to one pair of wheels and the other of said pistons being connected to the linkage to the other pair of wheels, said pistons in said cylinder being rotatable and being provided with coupling claws on their end faces for rigid interconnection.

3. In a vehicle having two pairs of wheels, a track rod connecting the two wheels of each of said pairs for steering movement of said wheels, a first linkage connected to one of said track rods and a second linkage connected to the other of said track rods, a first steering wheel connected to act upon the track rod of one of said pairs of wheels, a second steering wheel connected to act upon the track rod of the other of said pair of wheels, a cylinder containing two axially-aligned pistons axially and displaceable individually within said cylinder by fluid pressure means, means within said cylinder and on said pistons for selectively coupling one of said pistons to said cylinder and selectively coupling said pistons to each other, one of said pistons being connected to the linkage to one pair of wheels and the other of said pistons being connected to the linkage to the other pair of wheels, said pistons being connected to said linkages by means of piston rods projecting out at the ends of the cylinder.

4. In a vehicle having two pairs of wheels, a track rod connecting the two wheels of each of said pairs for steering movement of said wheels, a first linkage connected to one of said track rods and a second linkage connected to the other of said track rods, a first steering wheel connected to act upon the track rod of one of said pairs of wheels, a second steering wheel connected to act upon the track rod of the other of said pair of wheels, a cylinder containing two axially-aligned pistons axially and displaceable individually within said cylinder by fluid pressure means, one of said pistons being connected to the linkage to one pair of wheels and the other of said pistons being connected to the linkage to the other pair of wheels, said pistons in said cylinder being rotatable and being provided with coupling claws on their end faces for rigid interconnection, said pistons being connected to said linkages by means of piston rods projecting out at the ends of the cylinder, and said cylinder and said pistons being provided with interengaging claws for selectively coupling said pistons to said cylinder whereby to lock the linkage and the track rod connected to the piston coupled with the cylinder.

5. In a vehicle having two pairs of wheels, a track rod connecting the two wheels of each of said pairs for steering movement of said wheels, a first linkage connected to one of said track rods and a second linkage connected to the other of said track rods, a first steering wheel connected to act upon the track rod of one of said pair of wheels, a second steering wheel connected to act upon the track rod of the other of said pair of wheels, a cylinder containing two axially-aligned pistons axially and displaceable individually within said cylinder by fluid pressure means, means within said cylinder and on said pistons for selectively coupling one of said pistons to said cylinder and selectively coupling said pistons to each other, one of said pistons being connected to the linkage to one pair of wheels and the other of said pistons being connected to the linkage to the other pair of wheels, a fluid pressure medium supply tank and means selectively connecting said tank to said cylinder on both ends of said pistons.

6. In a vehicle having two pairs of wheels, a track rod connecting the two wheels of each of said pairs for steering movement of said wheels, a first linkage connected to one of said track rods and a second linkage connected to the other of said track rods, a first steering wheel connected to act upon the track rod of one of said pairs of wheels, a second steering wheel connected to act upon the track rod of the other of said pair of wheels, a cylinder containing two axially-aligned pistons axially and displaceable individually within said cylinder by fluid pressure means, means within said cylinder and on said pistons for selectively coupling one of said pistons to said cylinder and selectively coupling said pistons to each other, one of said pistons being connected to the linkage to one pair of wheels and the other of said pistons being connected to the linkage to the other pair of wheels, a fluid pressure medium supply tank and means selectively connecting said tank to said cylinder on both ends of said pistons, said last-named means including control valves actuatable by the driver at each end of the vehicle.

References Cited in the file of this patent

UNITED STATES PATENTS

| | | |
|---|---|---|
| 859,235 | Macfarren | July 9, 1907 |
| 1,544,775 | Plocek | July 7, 1925 |
| 2,274,821 | Bloxsom | Mar. 3, 1942 |